Jan. 19, 1971     E. T. GETZ ET AL     3,557,264
LOAD SUPPORTING STRUCTURES
Original Filed Dec. 23, 1965     5 Sheets-Sheet 1
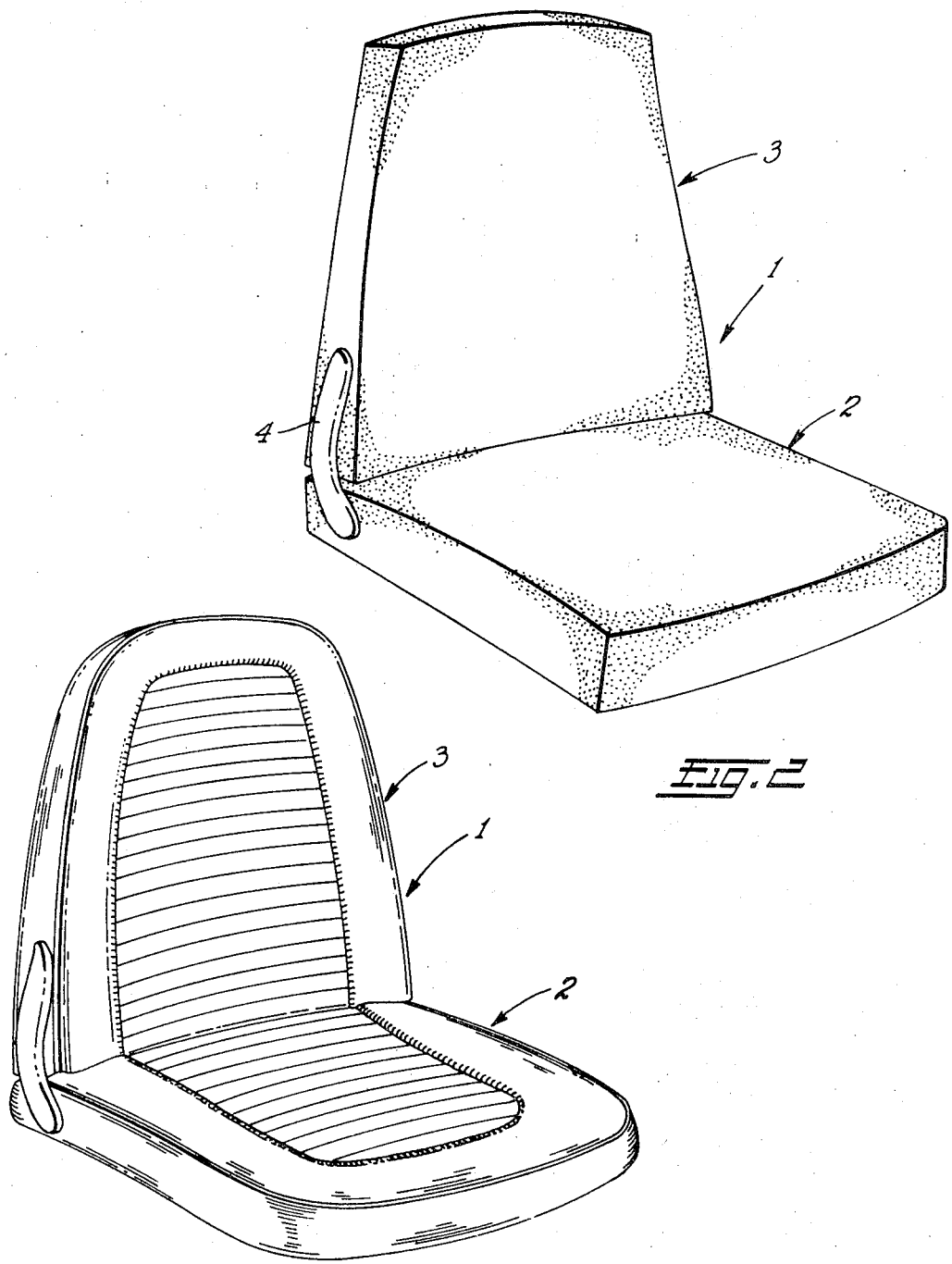
INVENTORS
EDWARD T. GETZ
MATTHEW PACAK
BY
ATTORNEYS

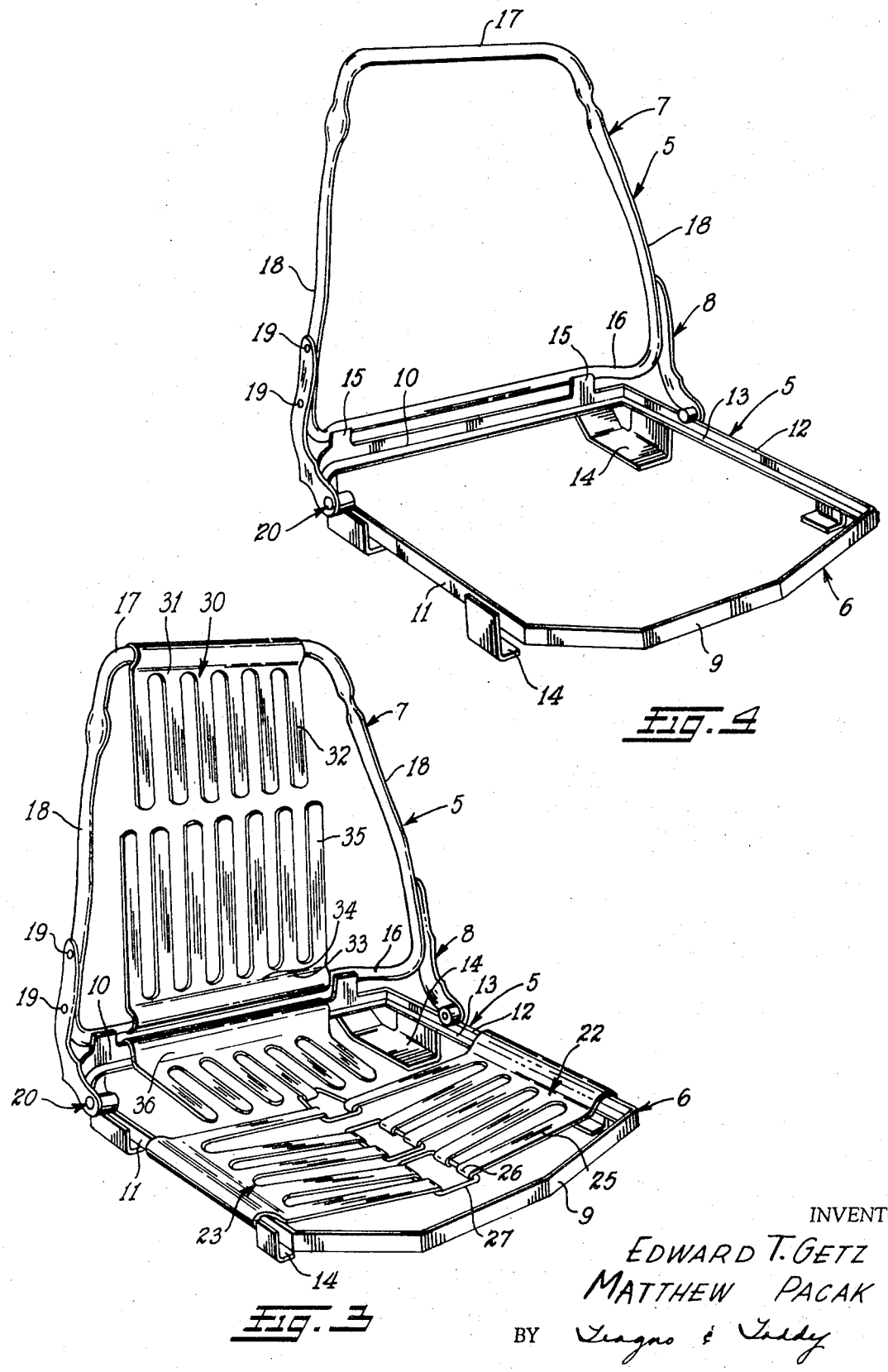

Jan. 19, 1971  E. T. GETZ ET AL  3,557,264
LOAD SUPPORTING STRUCTURES
Original Filed Dec. 23, 1965  5 Sheets-Sheet 3
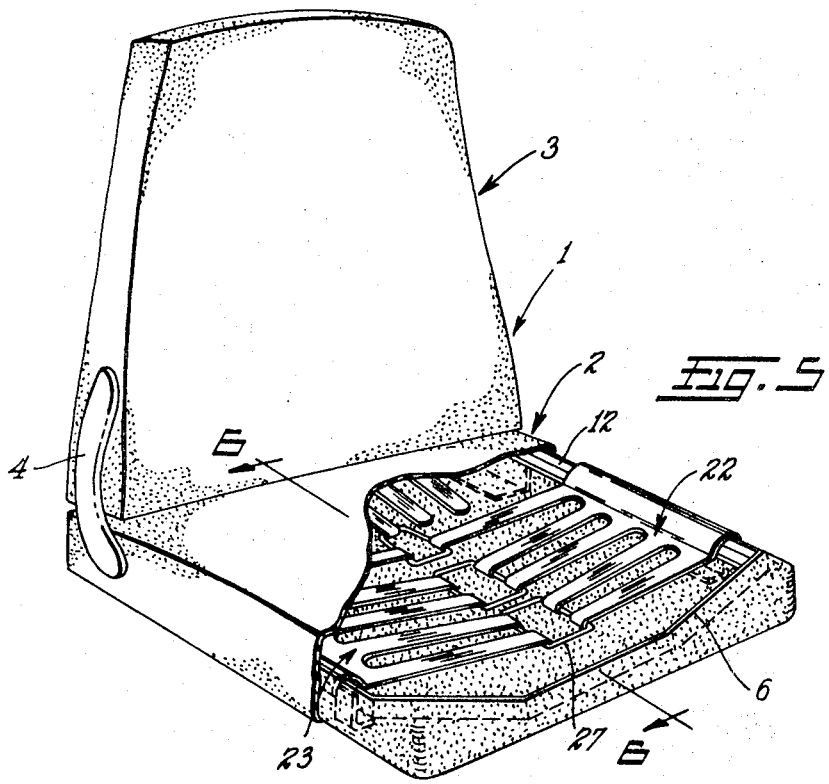
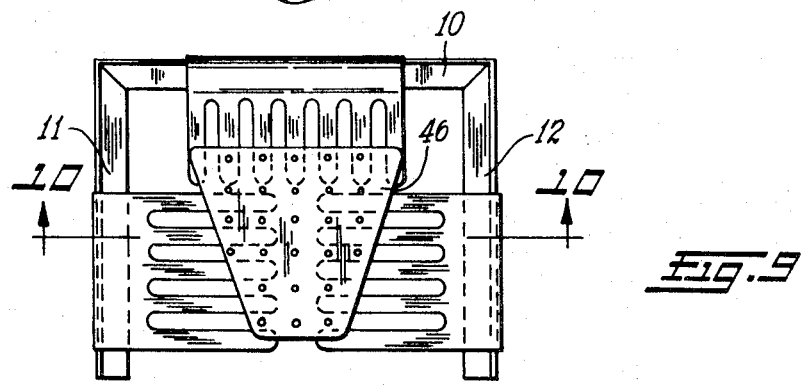
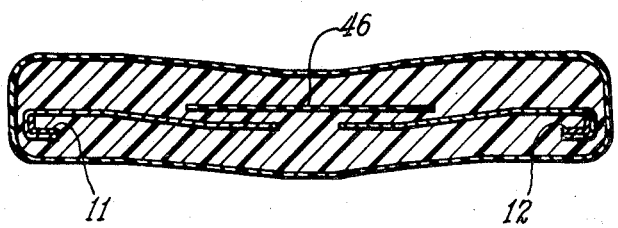
INVENTORS
EDWARD T. GETZ
MATTHEW PACAK
BY
ATTORNEYS Jan. 19, 1971   E. T. GETZ ET AL   3,557,264
LOAD SUPPORTING STRUCTURES
Original Filed Dec. 23, 1965   5 Sheets-Sheet 4

INVENTORS
EDWARD T. GETZ
MATTHEW PACAK
BY
ATTORNEYS

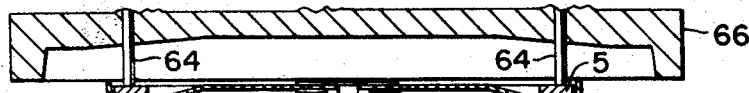
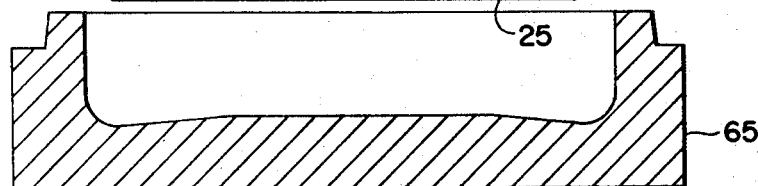
Fig. 12
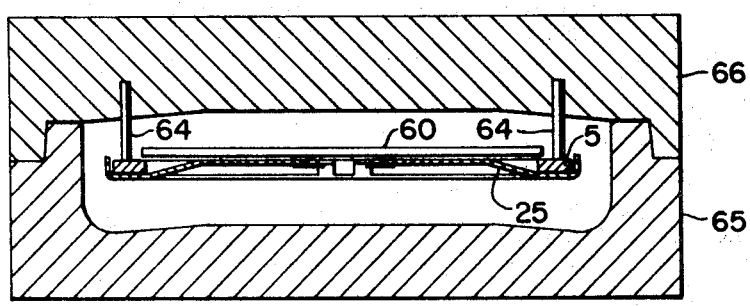
Fig. 13
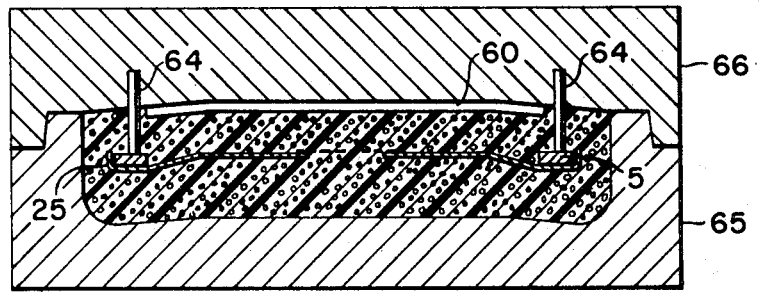
Fig. 14
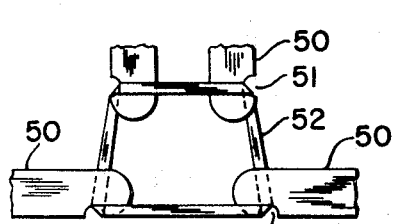
Fig. 11
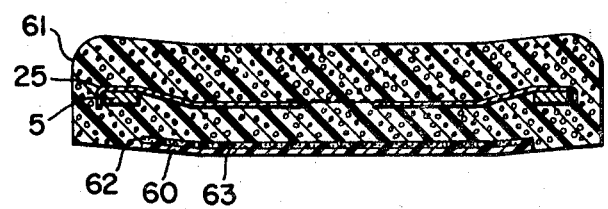
Fig. 15
INVENTORS
EDWARD T. GETZ
MATTHEW PACAK
BY  *Teagno & Teddy*
ATTORNEYS United States Patent Office 3,557,264
Patented Jan. 19, 1971

3,557,264
LOAD SUPPORTING STRUCTURES
Edward T. Getz, Cleveland Heights, and Matthew Pacak, Solon, Ohio, assignors to Eaton Yale & Towne Inc., Cleveland, Ohio, a corporation of Ohio
Application Dec. 23, 1965, Ser. No. 528,671, now Patent No. 3,353,869, which is a continuation-in-part of application Ser. No. 479,068, Aug. 12, 1965. Divided and this application Sept. 21, 1967, Ser. No. 698,075
Int. Cl. B29d 12/00
U.S. Cl. 264—45
1 Claim

ABSTRACT OF THE DISCLOSURE

This invention relates to a method of molding a foam cushion by placing a frame parallel to and spaced from the bottom and top of a closed mold and placing a preformed pad between the top surface of the closed mold and a load transfer means of the frame and introducing a polyurethane foam within the mold below the preformed pad and thereafter allowing said polyurethane to expand and fill said mold and subsequently curing said polyurethane

---

This invention relates to a seat construction adaptable for use in vehicle seats, furniture, etc., or other load supporting devices of this general type. More specifically, this invention is directed to a new and novel combination of supporting members, flexible load supporting and transferring structure and resilient material to provide a novel cooperation of these elements in their combined form to result in a new and improved seat construction.

This is a division of co-pending application Ser. No. 528,671, filed Dec. 23, 1965, now Pat. 3,353,869, dated Nov. 21, 1967, which is a continuation-in-part of Ser. No. 479,068, filed Aug. 12, 1965 and now abandoned.

In the prior art, cushion or seat constructions used as load supporting members of this general type do not take maximum advantage of the combination of a supporting frame and resilient material making up such cushion or seat. Such devices, for example, contain flexible members embedded in the resilient material such as foam, the flexible members being attached to the frame which is adapted to be carried, for example, in the case of furniture on the furniture legs or in the case and vehicle seats on the brace and sub-frame members protruding from the floor of the vehicle. In these latter types of seat constructions the foam material does not surround the frame and does not fully cooperate with the under or lower surfaces of the flexible members to provide the greatest utility to the combination of the elements making up the seat construction.

It is an object of this invention to provide a seat construction having a supporting member, flexible load supporting and transferring structure and resilient material to obtain the maximum utility from each of these members and their association with the other members making up the seat construction.

It is another object of this invention to provide a seat construction having opposed supporting members, flexible load supporting and transferring structure and resilient material surrounding the supporting members to gain maximum advantage from the cooperation between the supporting members and the resilient material.

It is a further object of this invention to provide a seat construction having support members, flexible load supporting and transferring structure carried on the support members in cantilevered relationship, and resilient material bonded or adhered at least to the lower surfaces or underside of the flexible load supporting and transferring structure so that loads applied to the seat are proportionally transferred by the flexible load supporting transferring structure and the resilient material to the support members.

It is still a further object of this invention to provide a seat construction having support members, flexible load supporting and transferring structure cooperating with a resilient material which surrounds the support members, the flexible load supporting and transferring structure being so constructed so as to provide the maximum amount of cooperation with the resilient material in the area of the seat receiving the greatest load.

An additional object of the present invention is the provision of a new and improved load supporting structure which comprises a frame having load supporting and transferring structure mounted thereon surrounded by a first pad of elastomeric material having predetermined physical properties, and a preformed pad of elastomeric material having different physical properties molded into a major portion of a face of said first mentioned pad.

Yet another object of this invention is provision of a load supporting structure as noted in the next preceding paragraph wherein the inner face between the first and second pads is of denser, tougher consistency than either of said pads to provide a reinforced seat structure with a relatively soft outer surface.

A further object of this invention is to provide a load supporting structure having a frame, load supporting and transferring structure carried on the frame, elastomeric material of a predetermined density bonded to at least one side of the load supporting and transferring structure, and a preformed pad of elastomeric material of a lesser density mounted into one face of the load supporting structure to provide a reinforced seat structure with a relatively soft outer surface.

It is an additional object of this inventional to provide a closed mold process for making a new and improved integral foam cushion unit having a frame, load supporting and transfer means, flexible elastomeric material and a preformed pad molded into one face of said unit.

Still further objects of this invention will become apparent upon a reading of the following detailed description of this invention and annexed drawings which disclose:

FIG. 1 is a prospective view of a so-called bucket type seat for use in vehicles illustrative of one possible application of the cushion construction of this invention.

FIG. 2 is a prospective view of the illustrative application of the seat construction of this invention disclosed in FIG. 1 with the seat being shown in a partially completed or unupholstered form.

FIG. 3 is a prospective view of one form of the flexible load supporting and transferring structure attached to supporting members.

FIG. 4 is a prospective view of the form of supporting members, illustrated in FIG. 3.

FIG. 5 is a perspective view of the seat construction of FIG. 2, certain portions being broken away to illustrate the relationship of the supporting members, flexible load supporting and transferring structure and resilient material.

FIG. 9 illustrates a modified form of the flexible load supporting and transferring structure.

FIG. 10 is a sectional view of the seat construction similar to FIG. 6, but disclosing in section the modification of the flexible load supporting and transferring apparatus illustrated in FIG. 9 with the flexible load supporting and transferring apparatus being surrounded by foamed elastomeric material.

FIG. 11 is a plan view of portions of the load supporting and transfer means showing a modified form of connecting means resiliently attaching the unsupported portions.

FIGS. 12–14 represent successive steps in the process for making the foam cushion unit of FIG. 15 according to the present invention.

Before explaining the present nivention in detail it is to be understood that the invention is not limited in its application to the particular construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

Figure 7:
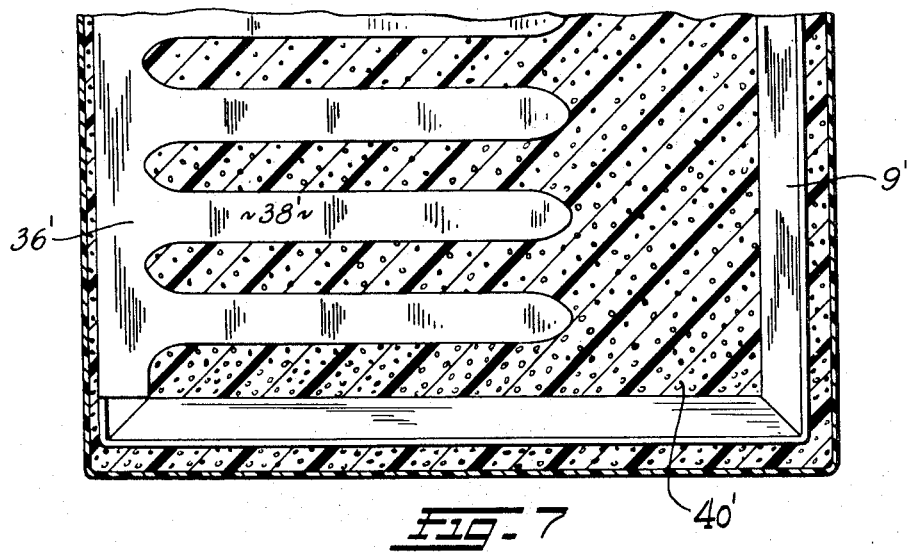
FIG. 7 is a partial top plan view of a bench type seat illustrating another application of the novel seat construction of this invention, with the resilient material above the finger set removed.

Referring to the drawings, FIG. 1 discloses an illustration of one application for the new and novel seat construction of this invention. This particular application is a bucket type seat for use in vehicles. Other applications of the seat construction of this invention will become apparent hereinafter, for example, in the environment of the base or back portion of a bench type seat as illustrated by FIG. 7. The seat construction shown in FIG. 1 at 1 comprises a base portion 2 and a back portion 3 for supporting the buttocks and back of the vehicle passenger. As mentioned, this seat construction is only illustrative of the varied and numerous applications of the novel seat construction of this invention, as will become apparent hereinafter. FIG. 2 discloses the seat construction of FIG. 1 with the upholstery or outer cover removed to illustrate that the supporting members and flexible load supporting and transferring structure are surrounded by the resilient material of the cushion construction to provide maximum utility to the combination of these members, as will become apparent hereinafter. FIG. 2 as well as FIG. 1 also illustrates a hinged connection 4 between the base portion 2 and back portion 3 so that the back portion can be pivoted forward to provide accessibility to the rear passenger area of the vehicle as is well known.

Referring to FIGS. 3 and 4, there is illustrated one form of the supoprting members and flexible load supporting and transferring structure of the cushion construction of this invention. The supporting members 5 of this seat construction comprise base support members 6 and upwardly extending back support members 7 hinged through a connection 8, similar to the hinge connection 4. It is evident that the hinged connection 8 can be eliminated and the connection between base portion 6 and back portion 7 made rigid for the production of a non-fold seat as used in a 4-door sedan.

The support members 6 for the seat construction comprises a semicurved front rail 9 and an opposed substantially, straight rear rail 10. Straight side rails 11 and 12 join the respective ends of the front and rear rails 9 and 10 to produce a generally open square frame.

The front rail 9, rear rail 10 and side rails 11 and 12 are made of angle iron with one leg vertically disposed to provide a lip 13 for attachment of finger sets 22, 23 and 36 as will become apparent hereinafter.

Feet members 14 are provided at the corners of the support member 6 so that the entire construction can be attached to a suitable pair of guide rails in the automobile on which seats are customarily mounted to provide for adjustment of the seat relative to the steering wheel to accommodate drivers of differing size as is well known.

Upstanding stop lugs 15 are provided near the ends of the rear rail 10. These abut the bottom rail 16 of the hinged back supporting member 7 and aid in providing proper orientation for that unit.

The back supporting member 7 comprises a bottom rail 16 and an opposed top rail 17 secured together by opposed side rails 18, the top rail being of lesser span or length than the bottom rail. Side rails 18 converge from the ends of the bottom rail 16 inwardly and upwardly to the ends of the top rail 17 to provide the contoured, upwardly tapered back supporting member 7.

The back supporting member 7 is suitably made from a single piece of strap iron bent to produce the rails enumerated, with the terminal ends joined together to produce an endless unit.

The strap hinges 8 have their upper ends riveted or the like as at 19 to the lower portions of the side rails 18. The lower portions of the strap hinges 8 bend forwardly in an arc and carry pins 20. The pins 20 fit into tubular sockets 21 fastened to the rear portions of the side rails 11 and 12 of the base support members 6. The back frame is thereby adapted to be folded forward as in a two-door auto application.

Each flexible load supporting and transferring structure illustrated in FIGS. 3 and 5 comprise a plurality of flat members having a common base portion secured, attached or otherwise carried in cantilevered relationship on the rail members making up the base supporting members or the back support members. These flexible load supporting and transferring members illustrated comprise a plurality of elongated finger-like elements 25, or finger sets which extend or project into the area of greatest load. In the seat illustrated, the area of greatest load in the base portion 6 is located between the rear rail member 10 and the transverse centerline of the seat. In the back portion 7, the area of greatest load is located between the rail 16 and the transverse centerline of the back portion 7.

At the front of the seat, there are two opposed finger sets 22 and 23. The left-hand set 22 comprises a common base member 24 from which five fingers 25 extend in parallel, spaced relation. The fingers 25 in this actual embodiment of the invention are about 1" wide and spaced about 1" apart. The finger set including fingers 25 and the common base member 24 is folded over in a U-section and hooked over the side rail 12 to prevent movement of the finger sets toward the center of the seat upon application of a load to the seat.

Referring to FIG. 3 for example, the main portion of the fingers 25 are offset from the plane of the rails or frame in a direction away from the top surface of the seat. Thus, the major portion of each finger lays in a plane offset downwardly from the upper edge of the frame. The offset arrangement of the fingers, prevents or alleviates fatigue failures of the fingers at the edge of the rails and the detrimental formation of a permanent set in the fingers and the foam rubber above the fingers upon cyclic loading of the unit.

Opposite the left-hand fingers set 22 is the right-hand set 23. The right- and left-hand sets 23 and 22 are similar in structural configuration.

The right-hand set 23 is attached to the right-hand rail 11 by the folded over U-section common base member 28. The inner ends of the fingers 25 on both finger sets are hook-shaped as at 26 and are positioned in opposed relation for receiving rubber bands 27.

The rear rail 10 of support members 6 also carries a finger set 36. This finger set is similar to finger set 22 and 23 in that it contains a base portion 37 snapped on to rail 10 and carrying a plurality of finger-like elements 38 extending into the medial area of the seat. At least one of the finger elements 38 is turned over in its end area for receipt of a rubber band 27 carried by fingers on the finger sets 22 and 23.

Attached to the back supporting members 7 are a plurality of flexible load supporting and transferring apparatus or members taking the form of finger sets similar on construction to finger sets 22 and 23. A finger set 30 is secured, attached or otherwise carried on the top rail 17 of the back supporting members 7. This finger set comprises a base member 31 attached to rail 17 by a folded over, U-section and carries finger-like elements 32. Likewise, a finger set 33 is attached to bottom rail 16 of the support member 7 and is attached thereto by a folded over, U-section. The base portion 34 of finger set 33 carries a plurality of finger-like elements 35.

Figure 6:
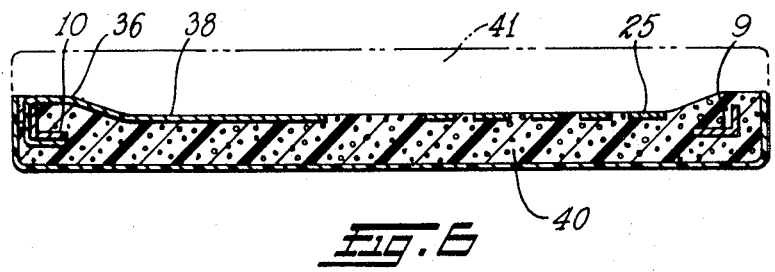
FIG. 6 is a sectional view of a portion of the seat construction illustrated in FIGS. 2 and 5 as taken along line 6—6 in FIG. 5.

FIG. 5 of the drawings illustrates the relationship of the above described support members and flexible load supporting and transferring apparatus and resilient material making up the overall combination of the cushion construction. FIG. 6 also illustrates such combination and association and as shown, discloses support members 9 and 10 as well as finger set 36 mounted on support member 10. The finger-like elements 38 extend or protrude into the medial area of the cushion.

The resilient material 40 is a foam rubber, preferably polyurethane foam, or other similar elastomeric or rubber-like foamed material bonded or secured to at least the underside or bottom surface of the finger sets and is bonded or secured to support members 9 and 10. Preferably the foamed material 40 completely surrounds the support members 9 and 10. The resilient material 40 extends between such support members, and the resilient material functions in cooperation with the support members as an independent supporting means within the cushion construction. As shown in FIG. 6, the resilient material as mentioned, preferably surrounds and is bonded to the support members 9 and 10 in their entirety and extends therebetween, so upon application of loads of the type in the vehicle seat environment, the resilient material will remain fast to the support members and transfer such load to the support members. The resilient material is adhered or bonded to at least the lower surface or underside of the finger-like elements and the entire finger set. By bonding or adhering the resilient material to the lower surface area of the finger set, such material beneath the fingers is placed in tension upon an application of a load to the cushion structure. Thus, full advantage is taken of the cooperation between the finger set and the resilient material since any loads applied to the cushion substantially normal to the cushion surface are transferred laterally throughout the resilient material which is bonded to the underside of the finger-like elements. To take full advantage of this principle, a considerable depth of resilient material is provided below the finger-like elements as shown in FIG. 6.

With the resilient material surrounding the supporting members and adhering to the finger set, which is attached to the supporting members, maximum advantage is taken of the cooperation between each of these elements. Any load applied to the cushion is proportionally taken by the resilient material itself, and by the flexible finger set in cooperation with the resilient material, since the resilient material completely surrounds the opposed support members 9 and 10 and the resilient material is adhered to at least the lower portion of the flexible finger set.

It has been found through extensive testing by thousands of cycles of load application and release to cushion constructions of this type that the above described novel association of support member, flexible load supporting and transferring apparatus and resilient material provides a cushion construction with the durability required for application in the vehicle environment and yet is of minimum cost. Merely attaching the resilient material to a flexible load supporting member, such as the finger set illustrated, does not take advantage of the cooperation of resilient material and supporting members, which in itself as mentioned, can provide an independent supporting means. Further, merely attaching the resilient material to the support members and not to the under surface or extremity of the flexible members does not take full advantage of the physical relationship of the finger set, and resilient material so that such can cooperatively transfer loads to the support members.

Thus, surrounding the support members in a cushion construction with a resilient material and adhering or bonding such to the flexible members carried on the support members takes full advantage of the resilient material, support members and flexible supporting means making up such cushion construction.

Figure 8:
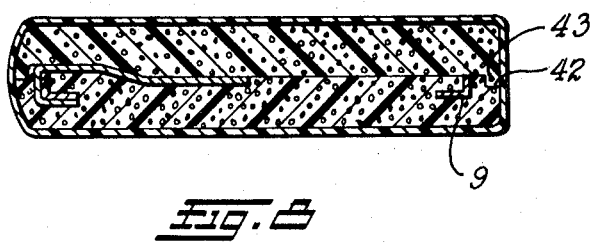
FIG. 8 is a sectional view similar to FIG. 6 disclosing a modification of the manner of attaching the upper portion of the resilient material to the lower portion of the resilient material of the seat construction.

In regard to the resilient material 41 disposed above the support members and the flexible load supporting and transferring structure, such can be merely placed upon the lower resilient material and held in place by the upholstery or covering around the cushion. This is illustrated in FIG. 6. Further, such upper portion 41 of resilient material can also be of different physical characteristics than the lower resilient material 40. For example, the upper portion 41 could be of less tensile strength than the lower portion 40 of the seat. Also, the upper portion 41 can have a different resiliency, softness or structural configuration. The upper portion 41 of the resilient material can also be adhered or bonded by means of an adhesive to the lower resilient material. FIG. 8 illustrates still a different means of attaching the upper portion 41 of the resilient material to the lower portion 40 of the resilient mtaerial as by a mechanical locking through the provision of interlocking groove 42 and rib 44 in the lower and upper resilient materials, respectively, making up the cushion.

The particular disposition of the flexible load supporting and transferring apparatus with respect to the location of the area in which the greatest load is to be applied to the cushion construction is also of importance. The use of finger-like elements as the flexible load supporting and transferring apparatus in this environment, as well as any similar elongated member, presents an advantage in that such can be configured to place a major portion thereof in the area of greatest load application so that maximum advantage is taken of the cooperation between the resilient material bonded to the under surface or bottom side of such members and the members themselves. For example, finger-like elements as illustrated in FIGS. 3 and 5 may be of different lengths, widths or overall structural configuration to take maximum advantage of the cooperation between the resilient material underneath the finger-like members and the members themselves.

FIG. 7 illustrates another application of the type of flexible load supporting and transferring structure of this invention, namely, a plurality of finger-like members extending from the rear rail of a bench type seat as would be used for example in the rear passenger area of a vehicle. As shown in FIG. 7, the rear rail carries a finger set 36' hooked over the rail in a manner similar to that illustrated in FIG. 3. The finger set 36' has integral finger-like elements 38' extending into the medial area of the seat and adjacent front rail 9'. The finger-like elements 38' of this illustrated embodiment of the invention are of greater length to provide additional support in cooperation with the layer of foamed elastomeric material 40' disposed below the finger-like elements. The foamed elastomeric material is adhered or bonded to the entire finger set, in the same manner as the finger sets illustrated in FIG. 3. Also, the foamed elastomeric material surrounds the rear and front rail members in the same fashion as described in reference to FIG. 3. The flexible load supporting and transferring structure as illustrated in FIG. 7 can comprise a plurality of finger sets each containing finger-like elements protruding from only a single support member and could be applied to the back portion of a seat having an elongated frame as in the rear seat of a vehicle. The upper portion of the resilient material making up the seat construction of FIG. 7 could be disposed in the manner referred to in regard to FIGS. 6 and 8.

Also, additional elements may be included as part of the flexible load supporting and transferring apparatus of the cushion construction such being illustrated in FIGS. 3 and 5 as rubber bands 27 attaching adjacent finger-like members together in the areas of the cushion receiving the greatest load. Such rubber bands are extensible upon application to provide as mentioned, the desired support in the area of cushion receiving the greatest load, and also provide additional resiliency and cooperation between the flexible finger-like members.

FIG. 11 shows another structural arrangement of the load supporting and transfer means in the form of finger sets 50 having notches 51 in their lateral edges for receiving the rubber bands 52. In this arrangement, the surfaces of the rubber bands 52 and the fingers 50 are parallel to the plane of the loading surface of the seat unit. The rubber bands 50 maintain the finger sets in the same plane within the seat unit which, it has been found, promotes even distribution of any load upon the seat unit throughout the finger sets througth the frame means. The notches 51 may be of any desired shape or configuration. Provision of notches in the lateral edges of the finger sets has been found to be advantageous in the making of relatively thin seats. The flat, notched fingers and flat bands 52, as shown in FIG. 11, do not present protrusions in the foam and provide a softer "feel" when sitting on the seat. The flat, notched fingers of FIG. 11 are more economical and easier to manufacture than the turned-over end fingers as shown in FIG. 3 as the fabrication step of turning the end of the finger over is not necessary. It has also been found that it is easier to foam around a flat, notched finger than a turned-over end in making the seat unit.

Reference is now made to FIGS. 9 and 10 which also illustrate additional flexible load supporting and transferring apparatus in a cushion construction of this invention, specifically a sheet of rubber-like material 46 disposed above the finger sets. Such flexible sheet of resilient material is disposed substantially in the medial area of the seat and extends throughout its greatest width toward opposed right and the left rails 11 and 12 adjacent rear rail 10 so as to provide additional support in the medial to rear area of the cushion as required for application to the vehicle environment. The sheet 46 is also perforated so that additional gripping or securement is provided between the sheet and resilient material.

In regard to the provision of flexible load supporting and transferring apparatus of the type illustrated, such can also be relieved or provided with spaced portions in the area of greatest load to provide a comfort zone within the cushion of the seat which would be completely resilient material or more flexible types of load supporting and transferring apparatus. One form of this arrangement is illustrated in FIG. 3, wherein the end portions of finger set 36 is spaced from finger sets 22 and 23 in the area of the cushion of greatest load application.

In accordance with the present invention as illustrated in FIG. 15, a seat construction is provided which includes a pad 60 of relatively soft, open-celled polyurethane foam which is supported by and bonded to a second pad 61 of a relatively denser polyurethane foam. In the seat construction shown in FIG. 15, the pad 60 is preferably cut from a selected polyurethane slab stock and subsequently molded to the base of the pad 61 to form a unitary and completed seat construction. The hardness of the composite seat may be varied by a variation of the thickness of the pad 60 relative to the thickness of the base pad 61 or in varying the relative densities or the physical characteristics of the respective pads. The prefoamed pad 60 may range in thickness from 1/4" to 1" but it has been found that a 1/4" thickness is preferable. While molding the pad 60 to the base of the pad 61, the wet foam forming the pad 61 impregnates the slab 60 and creates a layer at the interface 63 between the pads 60 and 61 which is denser and tougher than either pad 60 or 61. Also, the use of the prefoamed pad 60 ensures a smooth, soft surface of the seat because without the pad 60 the air within the mold and gases formed during the foaming of the polyurethane are trapped and cause voids or pockets to be formed in the outer surface of the seat.

Referring to FIGS. 12–14, mold 65 and mold cover 66 are shown in cross-section. The frame 5, with its load supporting and transfer means 25, is supported during the molding operation in spaced relationship preferably from the mold cover 66, by any suitable means 64 such as screws, bolts, magnetized pins or the like. The prefoamed pad 60 is shown in FIG. 13 as placed between the suspended frame and the mold cover 66. With the frame 5 supported in place and the prefoamed pad 60 placed on the frame, the polyurethane foam mixture is poured in a liquid state into the mold in a conventional manner in an amount sufficient to cover the bottom surface of the mold. The mold is then closed by placing the lid 66 on the mold and securing it in place and allowing the polyurethane foam mixture to react and rise, thereby filling the mold with foam. When the mixture reacts and rises, the resulting foam carries the prefoamed pad 60 from its unsecured position upon the frame 5, shown in FIG. 13, to the upper portion of the mold against the mold cover 66, as shown in FIG. 14. An alternative way of effecting placement of the prefoamed pad 60 in the upper surface of the seat unit would be to secure the preformed pad by pin means or other suitable means in place against the mold cover 66 before introduction of the polyurethane foam mixture into the mold. It is to be understood that this invention may be practiced not only with polyurethane foams such as polyether using the one-shot method but may also be used in conjunction with a polyether-urethane prepolymer. After the polyurethane foam mixture has foamed within the mold, the foamed mixture is cured and treated by a heating process in the usual manner. Foam articles produced in this manner with the preformed pad at the upper area of the mold were found to be practically free of defects while foams made without the preformed pad possessed considerable irregularities and defects upon removal of the mold lid 66. The resulting interface between the prefoamed pad 60 and the pad 61 is of denser, tougher consistency having a modulous of elongation substantially greater than either of the pads. This denser, tougher interface provides a reinforced seat structure with a relatively soft outer surface.

Having described our invention, we claim:
1. A method of molding an integral foam cushion unit comprising:
   placing a frame, having load transfer means connected thereto, parallel to and spaced from top and bottom surfaces of a closed mold having a cavity of the contour of the seat surface of the desired cushion unit,
   placing a preformed pad of relatively soft, open-celled polyurethane foam between the top surface of said closed mold and said load transfer means,
   introducing a polyurethane foam mixture within said mold below said preformed pad, said polyurethane foam mixture having a higer ultimate cured density than said preformed pad,
   allowing said polyurethane foam mixture to react and expand,
   thereby filling said mold with foam in surrounding relationship to said frame and against the underside of said preformed pad and thus raising the pad against the top of the mold, and curing said polyurethane foam mixture to permanently, cohesively secure said foam, said frame, said load transfer means and said preformed pad together and provide an interface between the preformed pad and the polyurethane foam mixture which is of denser, tougher consistency and greater modulus of elongation than the preformed pad and the polyurethane foam, to provide a structure having high internal strength and a soft upper seating surface.

References Cited

UNITED STATES PATENTS

| | | | |
|---|---|---|---|
| 2,838,100 | 6/1958 | Follows | 264—45 |
| 3,161,436 | 12/1964 | Hood | 264—46 |
| 3,273,179 | 9/1966 | Ridenour | 264—45 |

JULIUS FROME, Primary Examiner

L. M. GARRETT, Assistant Examiner

U.S. Cl. X.R.

264—54; 297—452